Dec. 10, 1963 G. HOWARD 3,113,584
EMERGENCY FUEL SUPPLIES
Filed Aug. 1, 1961
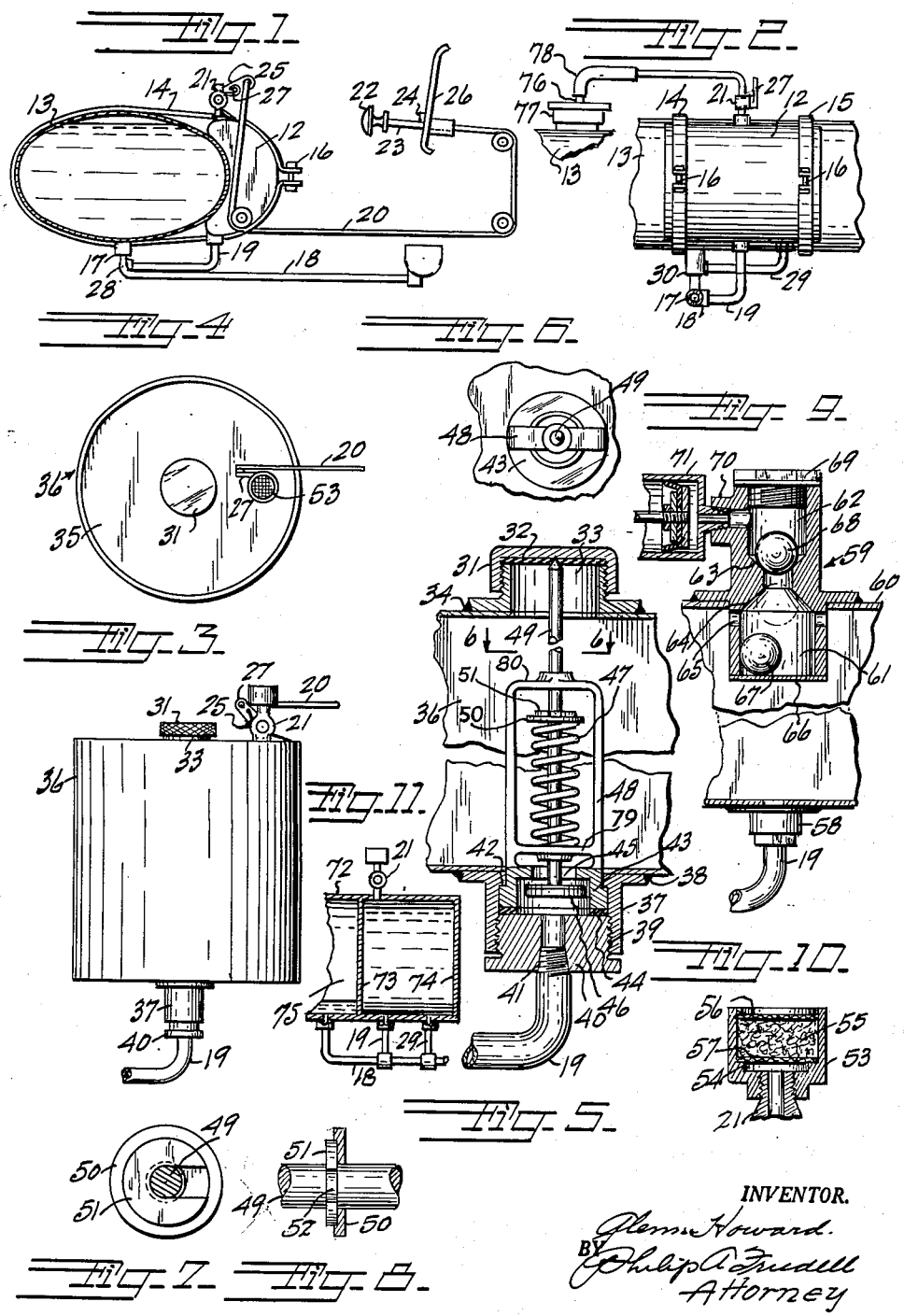
INVENTOR.
Glenn Howard
BY Philip A. Trudell
Attorney

United States Patent Office 3,113,584
Patented Dec. 10, 1963

3,113,584
EMERGENCY FUEL SUPPLIES
Glenn Howard, Oakland, Calif.
(426 S. Spring St., Los Angeles, Calif.)
Filed Aug. 1, 1961, Ser. No. 128,467
1 Claim. (Cl. 137—266)

This invention relates to improvements in emergency fuel supplies for automative vehicles and water craft, and provides a semi-automatic, operator controlled supply, which, when the main fuel supply is exhausted as evidenced by missing and sputtering of the motor caused through admission of air into the main fuel line, will continue operation on the same basis, of continued missing and sputtering until the operator provides the direct communication of the emergency supply, thus avoiding the sudden dying of the motor, and thus continuing spasmodic operation until the necessary control can be actuated.

As is well known, running out of gas constitutes the major portion of traffic delays and hazards, and in the majority of cases, even if there is no accident, the cost of obtaining a supply under such conditions is quite costly, especially on main highway bridges or long distances from service stations, and so far as known, all emergency supplies so far advanced have had two serious drawbacks, providing hazards; one, leakage of the valve in a main fuel line; two, sudden dying of the motor before the operator can open the control valve, which at times becomes fouled or clogged with mud or other matter, making it impossible for the operator to open the valve without getting out of the vehicle and manually operating on the valve, thus endangering himself, in addition to the possibility of having another vehicle smash into the rear of his vehicle, in other words, creating a double hazard.

With my invention there is no valve in either fuel line, the emergency supply is always in communication with the main supply and main fuel line, and in the event of failure of the main supply, the emergency supply will be delivered in small amounts each time that the fuel in the fuel line drops below the discharge for the emergency supply, and thus maintaining operation of the motor in a spasmodic manner until the operator actuates the emergency control, the control being remote from the fuel lines and not subject to splash or to weather conditions, and unlike others, presenting no fire hazard.

The objects and advantages of the invention are as follows:

First, to provide an emergency fuel supply for automotive vehicles and water craft which is free of any fire hazard.

Second, to provide an emergency fuel supply as outlined in which the fuel supply lines are continuous and free of intervening valves, for complete freedom from leakage or jammed valve operating mechanism.

Third, to provide an emergency fuel supply as outlined which is semi-automatic in operation, by providing fuel and air in small amounts to maintain erratic operation of the vehicle until the operator can actuate the emergency fuel release, and thus preventing sudden inoperative condition of the vehicle.

Fourth, to provide an emergency fuel supply as outlined which, in one form is of the simplest possible construction and economical to manufacture and install.

In describing the invention reference will be had to the accompanying drawings, in which:

FIG. 1 is an end elevation of the invention with the main fuel supply tank shown in section and including the operator's control means.

FIG. 2 is a front elevation of the emergency tank in FIG. 1 with the operator's control eliminated and with the connections modified.

FIG. 3 is a side elevation of a modification of the invention in which the emergency tank is located in a plane above the main fuel supply tank.

FIG. 4 is a top plan view of FIG. 3.

FIG. 5 is an enlarged sectional elevation through the filling control means for the tank shown in FIG. 3, in which the tank is filled by hand.

FIG. 6 is a view taken on line 6—6 of FIG. 5.

FIG. 7 is a top plan view of the spring seat locking means for the spring shown in FIG. 5, and with the valve stem shown in section.

FIG. 8 is a fragmentary view showing a side projection of FIG. 7.

FIG. 9 is a vertical section through the vacuum actuated filling means for the emergency tank.

FIG. 10 is a vertical section taken through the fire screen and filter for the emergency fuel release valve.

FIG. 11 is a section through another modification, in which one end of the main fuel supply tank is partitioned off to provide an emergency supply, and is a fragmentary view.

The simplest form of the invention is illustrated in FIGS. 1 and 2, being automatically filled from the main fuel supply, through control by the operator, semi-automatic upon exhaustion of the main supply and releasable at will by the operator of the vehicle, and consists of an emergency supply tank of any desired form, though if crescentic in form as shown at 12, provides for the simplest form of installation since the tank 12 can be fixedly secured to the main tank 13 by means of straps 14 and 15, which are clamped as indicated at 16, the only other connections required being the substitution of a two-way connection 17 on the bottom of the main tank, the reconnection of the main fuel line 18 and the connection of the emergency fuel line 19 to the two-way connection, and a suitable operative connection 20 from the release valve 21 to the operator's control 22 which may be of any suitable form and arrangement, but shown as a cable controlled by a plunger 23 which is provided with a key 24 to lock it in drawn-out position while the emergency supply is required.

The release valve 21 is normally closed by the spring 25, being shown in the open position for filling from the main tank. When filling is completed, the plunger 22 is turned for passage of the key 24 through a suitable passage in the instrument panel 26 or other suitable support, and pushed in to free the valve lever 27 for closing by the spring. This operation seals the emergency tank except at the bottom, which is sealed by the fluid in the main tank.

No fuel will be delivered from the emergency tank until the fluid level drops below the emergency tank connection at 28, at which time a small surge of air from the main tank will pass through the connection 19 to displace some of the fuel in the emergency tank and which will fill the connection 17 to seal off additional air until the level again drops below the upper connection. Thus, some air will be trapped and delivered to the main fuel line, thence the vehicle engine followed by another surge of air to supply another small surge of air and fuel, thus causing some missing or sputtering while maintaining erratic operation of the vehicle. By operating the manual control 22 to open the valve, a full continuous supply of fuel will be provided for operation of the vehicle to the next service station. With the air release valve closed, fuel can only be delivered in small amounts, as the connection is sealed by the fuel following each surge of air. The fuel cannot drain from the reserve tank continuously until such time as the air release valve is opened.

By adding a second connection 29 as shown in FIG. 2 to the main supply tank at a level above that of the connection 19, the fuel will be sealed in the emergency tank until the main fluid level drops below the connection 30 for the second connection, at which time air will pass through the connection 29 with fuel delivered through the connection 19, though only as the fuel level drops below that connection 30, thus maintaining a very low level supply with the conventional fuel gauge continuously indicating "empty." Thus operation of the vehicle would be uninterrupted and free of missing, backfiring or sputtering. The disadvantage in this arrangement would exist in the fact that the operator might not notice the gauge because of the uninterrupted operation.

In some cases the mounting of an emergency fuel tank coplanar with the main fuel tank might not prove feasible, therefore, it might be necessary to mount the emergency fuel tank in the trunk compartment or other suitable place, under which conditions the emergency tank could be filled manually or by vacuum.

FIGS. 3, 4, 5 and 6 illustrate a tank for manual refilling and consists of a conventional tank of any desired form and size which is provided with a cap 31 which is provided with a seal 32 to exclude all air and which is shown as threaded on the neck 33 which is suitably fixed as by welding 34 to the top 35 of the tank 36.

Since the bottom connection 19 is in direct communication with the main fuel tank, the tank 36 could not be filled without a closure for the connection. To place a manually operable valve in the line 19 would create a hazard because of possible leakage, valves for high test gasoline being very difficult to seal and maintain sealed against leakage, therefore an automatically controlled inside valve is essential, and is shown as consisting of a depending sleeve 37 which is suitably fixed to the bottom of the tank, as by welding indicated at 38, and which is threaded at its lower end as indicated at 39 for a plug 40 which may be provided with one connection 41 for the single communicating connection 19, or may have two spaced connections for the dual communicating connections 19 and 29 shown in FIG. 2.

The sleeve 37 is provided with an interior annular shoulder 42 for cooperation with the valve housing 43 which has a cooperative annular shoulder brought into mutual contact by the plug 40 with interposed sealing ring 44. This valve housing has an axial passage 45 which is normally closed by the valve 46 through the medium of the compression spring 47 which is seated on top of the lower cross member 79 of the yoke 48 which is integral with the valve housing, the valve stem 49 being slidable through the upper horizontal cross member 80 of the yoke 48 and normally extends to a plane above the top of the neck 33. FIGS. 7 and 8, indicate the method of providing the top seat for the spring 47, and consisting of a counterbored washer 50 having a bore in which the valve stem is slidable, with a horseshoe washer 51 fitting in an annular recess 52 provided in the valve stem, which permits the entire unit to be assembled, inserted in the sleeve and the plug with its sealing ring screwed into place to tightly seal the unit and tank. All of these parts are readily die cast and therefore very economical to manufacture.

As will be noted, when the cap 31 is removed, the spring 47 closes the valve 46 to permit filling the tank, and when filled, the cap can be screwed down the greater portion of the sealing distance before the valve stem is depressed to open the bottom of the container in communication with the main fuel tank, and which will operate in the same way as previously described for FIGS. 1 and 2.

For the double connection, connections 19 and 29, it is merely necessary to provide the plug with spaced threaded connections instead of the one connection shown. The control valve 21 is normally closed and similarly controlled from the operator's section of the vehicle or boat. For maximum safety, the valve is provided with a fire-screened filter, a suitable type being illustrated in FIG. 10 and which consists of a housing 53 which is fixed on the nozzle of the valve 21 as by threading, and which is provided with a recess 54 which is covered by a fine-mesh screen generally referred to as a fire screen, and which in turn is covered by a filling of filtering material 55 and in turn by a second screen 56, with the fire screen shown at 57.

The tank 36 can also be adapted for vacuum filling, in which case the valve system shown in FIG. 5, and the neck and cap are not required, the bottom of the tank having a plain connection 58 for the line 19, and instead of the previously described valve system and neck and cap, a double valve housing 59 is suitably fixed in the top 60 of the tank, the housing having a depending chamber 61 within the tank and an exterior chamber 62 above the tank top 60, these chambers having opposed valve seats 63 and 64. The chamber 61 has a plurality of intake passages indicated at 65 which are located just below the top wall 60 of the tank, and a support 66 is provided for the buoyant ball valve 67, the other valve 68 may be of any suitable type, gravity or spring loaded, and shown as consisting of a metal ball to seal by gravity. A cap 69 seals the upper chamber 62, and this chamber is provided with a connection 70 for a source of subatmospheric pressure, such as a hand pump 71, or connection may be made direct to the intake manifold of the vehicle engine.

The bottom support 66 may be formed of screen material or other material provided with passages for the fuel, the passages 65 providing for complete extraction of the air from the tank. As will be noted, as the level of the fuel rises above the bottom of the chamber 61, the buoyant valve ball 67 is gradually carried upward until the suction from the source of subatmospheric pressure draws the ball to its seat, sealing the tank and terminating further subatmospheric pumping, with the ball 68 seating and preventing any discharge when the source of subatmospheric pressure is terminated.

When this type of emergency tank is connected to the intake manifold of the vehicle engine, the tank will automatically be kept filled, since each time that the engine is stopped and the vacuum broken, the buoyant valve will drop from its seat, and when the engine is again placed in operation, the filling operation will be resumed if the fluid level has lowered in the emergency tank. When the valve 21 is opened, the vacuum in the emergency tank will be broken, permitting the emergency fuel to flow to the main fuel line and main fuel tank.

This system can also be applied to new main fuel tanks as illustrated in FIG. 11, in which the main tank 72 has a hermetically sealed partition 73 spaced from one end 74, and with the emergency chamber provided with the connection 19 to the main chamber 75, and also provided with the control valve 21.

The emergency supply tank in any of the various forms and arrangements can have the control valve 21 connected to the main supply tank as indicated in FIG. 2 which shows the simplest form of connection, in which a nipple 76 is provided on the cap 77, the connection 78 being flexible and resilient to frictionally fit on the nipple while also permitting convenient removal of the cap for filling the main tank, thus causing the emergency supply tank to obtain its air for discharge from the main supply tank and eliminating any fire hazard so far as the emergency supply tank is concerned.

Thus a system is provided which presents no fire hazard and in which the fuel connections are continuous and free of valves or obstructions, and are adaptable to semi-automatic or automatic operation and control, as may be desired.

I claim:

In a liquid fuel supply system for an internal combustion engine, including a fuel pump, a main fuel tank, a first fuel line in communication between said fuel pump and said main fuel tank, an emergency fuel tank having a supply of fuel and having a discharge outlet, and a normally closed air inlet valve for said emergency fuel tank and including manual control means for opening said valve at will for discharge of the contents of the emergency fuel tank to the main fuel tank,
  automatic signalling and control means for the emergency fuel supply comprising
  a depending dual communication member in communication with the lower portion of said main fuel tank, and including an inlet having a second fuel line in communication with said discharge outlet,
  said dual communication member including an outlet closely related below said inlet and
  providing the communication from said main fuel tank to said pump,
  said fuel lines being of conventional small bore internal combustion engine tubing for limited flow,
  whereby, when the fuel in the main fuel tank is exhausted, suction by the pump uncovers the inlet to admit air to the emergency fuel tank for discharge of a volume of fluid to the dual communication member, entrapping air in follow relation in the second fuel line as the pump retracts the fuel in the interim between admission of the air and discharge of the fuel, and thus causing erratic engine performance.

References Cited in the file of this patent
UNITED STATES PATENTS

| | | |
|---|---|---|
| Re. 15,999 | Woodhead | Feb. 10, 1925 |
| 1,298,872 | Bowles | Apr. 1, 1919 |
| 1,526,720 | Satake | Feb. 17, 1925 |
| 1,833,150 | Beechlyn | Nov. 24, 1931 |
| 2,059,716 | Swinburne | Nov. 3, 1936 |
| 2,178,564 | Crocker | Nov. 7, 1939 |
| 2,734,561 | Funkhouser | Feb. 14, 1956 |
| 2,771,944 | Thornburg | Nov. 27, 1956 |